Patented July 21, 1936

2,048,563

UNITED STATES PATENT OFFICE 2,048,563

RECOVERY OF SELENIUM

Frank F. Poland, New Brunswick, N. J., assignor to American Smelting and Refining Company, New York, N. Y., a corporation of New Jersey No Drawing. Application March 8, 1934, Serial No. 714,635

2 Claims. (Cl. 23—209)

This invention relates to the treatment of ores, metallurgical by-products, residues and similar materials, such as slimes, sludges, anode mud and the like, for the separation and recovery of values contained therein and provides a method of particular importance in the recovery of selenium from more or less complex mixtures containing various other elements including the noble or precious metals.

In addition to providing a method by which practically all of the selenium present in materials such as above described may be readily and economically separated and recovered, the invention also facilitates the recovery of other constituents. For example, the bulk of any tellurium present may be readily removed along with the selenium. Further, the period of time during which the noble metals are tied up in the recovery process is materially reduced.

In accordance with the invention, the material is treated in a manner calculated to convert the entire selenium content to selenite in solution. A separation is then effected between the selenite solution and insoluble constituents including all of the precious metal values following which elemental selenium is readily recovered from the solution. In order to effect the desired concentration of the selenium as selenite in solution, the invention contemplates subjecting the raw material to controlled oxidation, the degree of same being such that the selenium is oxidized to selenite (ous state) but not to selenate (ic state). By conducting the oxidation in the presence of suitable alkali compounds, the selenium is converted and concentrated practically in toto, as alkali selenite in solution. A separation is then effected in alkaline solution between the soluble and the insoluble constituents and each thereafter separately treated for the recovery of values respectively contained therein.

The following description directed to the treatment of anode mud produced in the electrolytic refining of copper is set forth to more fully and clearly illustrate one manner in which the invention may be practised. The flow-sheet illustrates one manner in which the invention may be practiced.

After suitably treating the anode mud in a roasting furnace to render the copper soluble in dilute acid, the copper may be dissolved and removed in acid solution by agitating the roasted mud in a 15% to 20% solution of sulfuric acid; or copper refining electrolyte, which contains substantial amounts of free sulphuric acid, may be used as the leaching medium. The solution may then be decanted off and the residue washed with water and filtered, after which the acid and wash water are preferably processed for the recovery of copper and acid. The following table shows the analysis of a typical residue or filter cake:

| | Per cent |
|---|---|
| Antimony | 2.20 |
| Arsenic | 1.58 |
| Bismuth | 0.07 |
| Copper | 4.17 |
| Lead | 11.7 |
| Nickel | 0.03 |
| Precious metals (Ag, Au, Pd, Pt) | 39.6 |
| Selenium | 13.78 |
| Sulfur | 3.55 |
| Tellurium | 2.44 |
| Tin | .38 |

Following the removal of the copper, the filter cake is preferably dried and ground and then subjected to the controlled oxidizing treatment contemplated by the invention. This treatment may be effected by mixing the material with appropriate quantities of a solid oxidizing agent such as sodium nitrate and incorporating the resultant mixture in molten sodium hydroxide. While the amount of sodium nitrate necessary to oxidize the selenium to the -ous state but not to the -ic state will depend upon the composition of the material treated, it may be said that in the case of a filter cake of the approximate analysis shown in the preceding table, practically a total separation of selenium may be obtained by mixing the material with an amount of sodium nitrate equal to approximately 12% by weight of the slimes treated and fusing the mixture with approximately an equal weight of sodium hydroxide within a temperature range of from 900° F. to 1200° F.

When the fusion of the slimes-sodium nitrate mixture and the molten caustic is complete, the whole mass is carefully and slowly added to an appropriate amount of water, for example, nine cubic feet for each one hundred pounds of slimes treated.

As a result of this treatment practically all of the arsenic, selenium, sulfur and silica and some of the lead and tellurium will dissolve in the caustic solution, while the precious metals, such as gold, silver, etc. remain uncombined as a residue or impure doré. Typical analyses of the caustic solution and impure doré are:

*Caustic solution*

| | Grams per liter |
|---|---|
| Sodium hydroxide | 150.0 |
| Selenium (ous) | 25.7 |
| Selenium (ic) | 0.41 |
| Silica | 23.0 |
| Lead | 12.6 |
| Arsenic | .75 |
| Tellurium | .44 |
| Precious metals (Ag, Au, Pd, Pt) | None |

*Impure doré*

| | Percent |
|---|---|
| Precious metals (Ag, Au, Pd, Pt) | 88.0 |
| Lead | 5.25 |
| Antimony | 2.03 |
| Copper | 1.8 |
| Tellurium | 0.13 |
| Selenium | 0.01 |
| Arsenic | 0.01 |

The alkali or caustic solution is then neutralized with sulfuric acid to precipitate such elements as tellurium and lead, filtered, the neutral solution acidified with sulfuric acid and treated with sulfur dioxide to precipitate red selenium which upon boiling with water yields black selenium ready for market.

The impure doré after washing with water may be agitated with hot dilute sulfuric acid which removes the remaining copper, traces of selenium and tellurium and any sodium compounds not removed during the washing step. The doré may be melted down using a very small amount of a sodium hydroxide-sodium nitrate flux which will result in a doré normally analyzing approximately 99% gold and silver and which may be readily parted as desired. The small amount of slag produced in the melting step is generally rich in lead and antimony and may be sent to the lead refinery.

While the use of sodium nitrate and sodium hydroxide has been described to effect the controlled oxidation of the selenium to the ous state, the use of other reagents is within the scope of the invention. For example, other oxidizing agents including air may be substituted for the sodium nitrate and other alkali compounds, for example, soda ash, may be used in place of sodium hydroxide. Also, equivalent potassium salts may be employed if desired. In any event, the reagents and the quantities in which they are used should be such that the selenium is fully oxidized to the ous state without appreciable quantities thereof being oxidized to the ic state.

While certain novel features of the invention have been disclosed and are pointed out in the annexed claims, it will be understood that various omissions, substitutions and changes may be made by those skilled in the art without departing from the spirit of the invention.

What is claimed is:

1. The process for treating anode mud, slimes, sludges and the like which contain copper, selenium and precious metals, which comprises leaching same to remove copper, and without intervening high temperature treatment subjecting the residue containing substantially the original selenium content and precious metals to oxidation in the presence of molten caustic alkali, and so controlling the oxidation that the selenium is converted in toto to alkali selenite without the formation of any substantial amounts of selenates, leaching the resultant fusion product whereby the alkali selenite enters into solution and the precious metals remain as insoluble residue, and precipitating selenium from the solution thereby recovering substantially the entire selenium content of the original material as one end product.

2. The process according to the preceding claim in which sodium nitrate is employed as the oxidizing agent.

FRANK F. POLAND.

CERTIFICATE OF CORRECTION.

Patent No. 2,048,563.                                    July 21, 1936.

FRANK F. POLAND.

It is hereby certified that error appears in the above numbered patent requiring correction as follows: In the heading to the printed specification, line 6, strike out the words and period "No Drawing."; and insert the following flow sheet as a part of the patent -

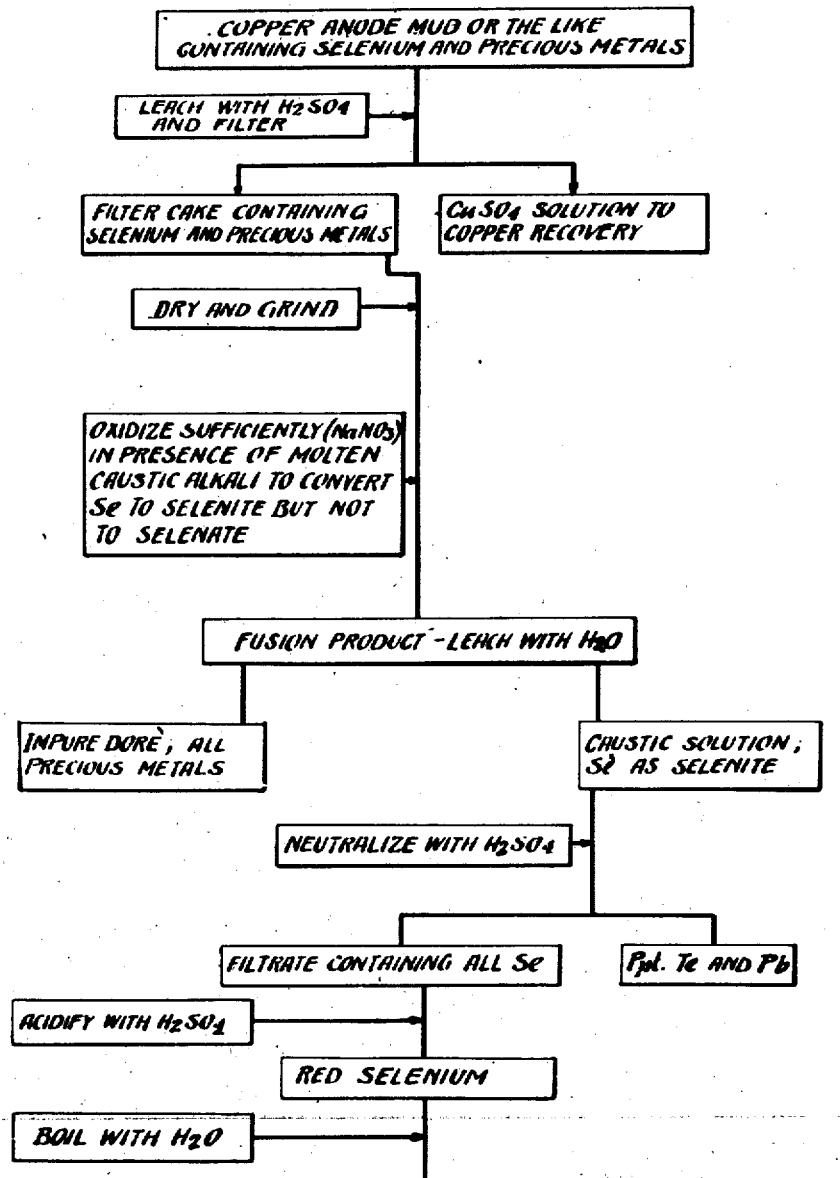

and that the said Letters Patent should be read with these corrections therein that the same may conform to the record of the case in the Patent Office.

Signed and sealed this 8th day of September, A. D. 1936.

(Seal)

Leslie Frazer
Acting Commissioner of Patents.